(12) United States Patent
Kontani et al.

(10) Patent No.: US 9,347,408 B2
(45) Date of Patent: May 24, 2016

(54) SADDLE TYPE VEHICLE

(71) Applicant: HONDA MOTOR CO., LTD., Tokyo (JP)

(72) Inventors: Masahiro Kontani, Wako (JP); Akihiro Yamashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/658,428

(22) Filed: Mar. 16, 2015

(65) Prior Publication Data
US 2015/0275832 A1 Oct. 1, 2015

(30) Foreign Application Priority Data
Mar. 26, 2014 (JP) .................. 2014-064453

(51) Int. Cl.
| | |
|---|---|
| *B62K 11/04* | (2006.01) |
| *F02M 35/16* | (2006.01) |
| *B60K 13/02* | (2006.01) |
| *B60K 13/06* | (2006.01) |
| *F02M 35/02* | (2006.01) |
| *F02M 35/04* | (2006.01) |
| *F02M 35/10* | (2006.01) |

(52) U.S. Cl.
CPC .............. *F02M 35/162* (2013.01); *B60K 13/02* (2013.01); *B60K 13/06* (2013.01); *B62K 11/04* (2013.01); *F02M 35/0201* (2013.01); *F02M 35/0204* (2013.01); *F02M 35/0207* (2013.01); *F02M 35/0209* (2013.01); *F02M 35/048* (2013.01); *F02M 35/10019* (2013.01); *B60Y 2200/12* (2013.01); *F02M 35/10321* (2013.01)

(58) Field of Classification Search
CPC . F02M 35/162; F02M 35/0201; B60K 13/02; B60K 13/06; B62K 11/04
See application file for complete search history.

(56) References Cited

U.S. PATENT DOCUMENTS

| 7,314,107 | B2 * | 1/2008 | Nakagome | ....... | F02M 35/10013 180/68.3 |
| 7,353,899 | B2 * | 4/2008 | Abe | ....... | B62M 27/02 123/184.21 |
| 8,133,292 | B2 * | 3/2012 | Morita | ....... | B62K 11/04 123/198 E |
| 2005/0051375 | A1 * | 3/2005 | Momosaki | ....... | F02M 35/10013 180/219 |
| 2008/0121450 | A1 * | 5/2008 | Fujimura | ....... | F02M 35/10039 180/68.3 |
| 2009/0243374 | A1 * | 10/2009 | Tahara | ....... | B60T 8/3225 303/3 |

(Continued)

FOREIGN PATENT DOCUMENTS

JP        7-42946  Y2  10/1995

*Primary Examiner* — Anne Marie Boehler
*Assistant Examiner* — Marlon Arce
(74) *Attorney, Agent, or Firm* — Birch, Stewart, Kolasch & Birch, LLP

(57) ABSTRACT

A saddle type vehicle including a frame of a monocoque structure having an air cleaner wherein the sealing property can be secured. An air cleaner includes a filter element disposed in a hollow main frame to partition the main frame into a dirty side region and a clean side region. An intake path member connects an engine below the main frame to the clean side region. A communicating opening for communicating with the engine is formed on a lower face side of the clean side region. The communicating opening is covered with a lid member. The lid member includes a first plate member with a communicating hole in which the intake path member to the engine is inserted, a second plate member for surrounding an outer periphery of the first plate member, and an elastic member provided between the first plate member and the second plate member.

20 Claims, 10 Drawing Sheets

(56) References Cited

U.S. PATENT DOCUMENTS

| | | | |
|---|---|---|---|
| 2013/0192912 A1* | 8/2013 | Shimomura | F02M 35/02416 180/68.3 |
| 2014/0360795 A1* | 12/2014 | Kawata | F02M 35/162 180/68.3 |
| 2014/0360797 A1* | 12/2014 | Kawata | F02M 35/0201 180/219 |
| 2015/0027797 A1* | 1/2015 | Miki | B62K 11/04 180/219 |
| 2015/0159604 A1* | 6/2015 | Nishimura | B62K 11/04 123/198 E |

\* cited by examiner

SADDLE TYPE VEHICLE

CROSS-REFERENCE TO RELATED APPLICATIONS

The present application claims priority under 35 USC 119 to Japanese Patent Application No. 2014-064453 filed Mar. 26, 2014 the entire contents of which are hereby incorporated by reference.

BACKGROUND OF THE INVENTION

1. Field of the Invention

The present invention relates to a saddle type vehicle. More particularly to a saddle type vehicle including a main frame of a monocoque structure wherein an air cleaner is built in the main frame.

2. Description of Background Art

A conventional saddle type vehicle is known wherein a main frame of a so-called monocoque structure includes an air cleaner built in the inside thereof which is formed in a hollow state. An engine is placed on the lower side of the main frame. In the main frame of the monocoque structure, air passes through the inside of the main frame, is purified by the air cleaner and is supplied to the engine through an intake passage connected to the main frame. See, for example, Japanese Utility Model Publication No. Hei 7-42946.

In Japanese Utility Model Publication No. Hei 7-42946, a structure which uses a member formed as a separate member from a main frame is used in order to seal an air system such as an intake duct. However, in a main frame of a monocoque structure, securing of the sealing property is a problem in comparison with an alternative case in which an air cleaner case is configured from a part of a resin to obtain an optimum structure for an engine configuration or a vehicle configuration. In particular, in the case of an air clear of a monocoque structure which uses a main frame, a sealing connection between an engine which vibrates and the air cleaner for which a vehicle body frame itself is used is difficult. Especially, in a multi-cylinder engine, where a difference in tolerance exists between individual cylinder units, it is a very difficult problem to maintain the sealability.

SUMMARY AND OBJECTS OF THE INVENTION

The present invention has been made in view of such a situation as described above, and it is an object of an embodiment of the present invention to provide a saddle type vehicle including a frame of a monocoque structure having a function of an air cleaner wherein the sealing property can be secured in compliance with an engine configuration or a vehicle configuration.

In order to attain the object described above, in an embodiment of the present invention, there is provided a saddle type vehicle including:

a main frame extending rearwardly of the vehicle from a head pipe and hollow in an inside thereof;

an air cleaner including a filter element disposed in the main frame to partition the main frame into a dirty side region and a clean side region;

an engine is disposed below the main frame; and an intake path member is configured to connect the engine and the clean side region to each other, the main frame includes a front opening formed at a front portion thereof for introducing air therethrough, wherein a communicating opening for communicating with the engine is formed on a lower face side of the clean side region, the communicating opening is covered with a lid member, and the lid member includes a first plate member in which a communicating hole in which the intake path member to the engine is inserted is provided, a second plate member which surrounds an outer periphery of the first plate member, and an elastic member provided between the first plate member and the second plate member.

According to an embodiment of the present invention, the saddle type vehicle is configured, such that the first plate member and the second plate member have connection portions opposing to each other with the connection portions being offset from each other in a heightwise direction, and the elastic member is provided between the connection portions.

According to an embodiment of the present invention, the saddle type vehicle further includes:

a seal lip is formed in a substantially annular shape so as to surround an edge portion of a periphery of the lid member in order to seal the lid member with respect to the main frame; and a fixing member is formed in a substantially annular shape so as to surround the lid member in order to attach the lid member to the main frame, the seal lip is interposed between the main frame and the fixing member and interposed also between the lid member and the fixing member.

According to an embodiment of the present invention, the lid member, fixing member, and seal lip are fastened together by a first fastening member to configure a lid member unit, and the fixing member is fastened and fixed to the main frame by a second fastening member.

According to an embodiment of the present invention, the elastic member is formed from a rubber material which connects the first plate member and the second plate member to each other by baking.

According to an embodiment of the present invention, the first plate member and the second plate member are formed from a synthetic resin, and recess and projection joining faces are formed at connection portions between the elastic member and the first plate member and second plate member.

According to an embodiment of the present invention, the lid member covers the communicating opening from below and the main frame is formed by casting, and an outer side wall face of an outer periphery edge portion of the communicating opening with which the lid member contacts is subject to polishing processing.

According to an embodiment of the present invention, the engine is a V-type engine wherein a plurality of cylinder units are disposed in the V-shape in a forward and rearward direction, and the lid member which holds the intake path member communicating with the cylinder units is disposed so as to be sandwiched between the cylinder units.

According to an embodiment of the present invention, the lid member which closes the communicating opening on the lower face of the clean side region which is a connecting portion between the engine is structured such that the air cleaner is provided in the internal space of the main frame and the main frame is configured such that the elastic member is provided between the first plate member in which the communicating holes into which the intake path member to the engine are inserted and the second plate member which surrounds the outer periphery of the first plate member. Therefore, upon assembly of the lid member, even if a tolerance appears between the arrangement of the intake path member and the arrangement of the communicating opening of the air cleaner, the tolerance can be permitted by the elasticity of the elastic member thereby to enhance the assembling property. Further, the sealing property between the clean side region and the engine side can be secured. Further, the lid member can effectively absorb also vibration differences between the engine and the main frame by the elasticity of the elastic member. In addition, the durability can be improved while the sealing property is secured.

According to an embodiment of the present invention, since the elastic member connects the first plate member and the second plate member to each other such that they are displaced from each other in the upward and downward direction, the elastic member can be expanded and contracted in the heightwise direction and can be deflected also in a transverse direction. Therefore, a three-dimensional movement (upward or downward, leftward or rightward, and forward or rearward movements) by vibration differences and so forth of the engine can be absorbed effectively. Further, the lid member can maintain the contact property of the connecting portion favorably, and the sealing property of the clean side region can be secured.

According to an embodiment of the present invention, the fixing member and the seal lip which are formed as separate members from each other are used for fixation of the lid member. Therefore, the sealing property between the lid member and the clean side region is secured. Further, suppression of transmission of vibrations between the main frame and the lid member and absorption of the vibrations can be carried out by the seal lip.

According to an embodiment of the present invention, since the lid member, fixing member and seal lip are configured as the commonly fastened lid member unit, when the lid member is assembled or disassembled, the three members can be treated as one member of the lid member unit, and the workability is good. Further, since the lid member can be fixed with certainty only by fixedly fastening the fixing member to the main frame by the fastening member, fastening which secures the sealing property of the clean side region can be achieved easily.

According to an embodiment of the present invention, the elastic member is formed from a rubber material to which the first plate member and the second plate member are baked. Consequently, the lid member can be treated as an integral part including the elastic member, and therefore, securing of the sealing property is easy together with enhancement of the handling properties.

According to an embodiment of the present invention, the first plate member and the second plate member are formed from a synthetic resin, and the recess and projection joining faces are formed on the connection portions between the elastic member and the first plate member and second plate member. Therefore, the joining area between the elastic member and the first plate member and second plate member can be made great. Consequently, the connection portions can achieve firm joining. Accordingly, the durability of the lid member is secured, and also the sealing property of the clean side region is maintained for a long period of time.

According to an embodiment of the present invention, the lid member covers the communicating opening from below and the main frame is formed by casting, and the outer side wall face of the outer periphery edge portion of the communicating opening with which the lid member contacts is subject to a polishing processing. Thus, the outer side wall face is formed not on an inner side wall face but on an outer face of the main frame. Therefore, the polishing processing performance is good, and the contact property of the outer side wall face with the lid member can be improved and the sealing property can be secured more readily.

According to an embodiment of the present invention, in the V-type engine having a plurality of cylinder units, the lid member having the elastic member which can absorb the tolerance between the cylinder units is provided. Therefore, even where the tolerance between the cylinder units and is accumulated, the tolerance can be absorbed by expansion or contraction of the lid member, and the lid member can secure the sealing property of the clean side region.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
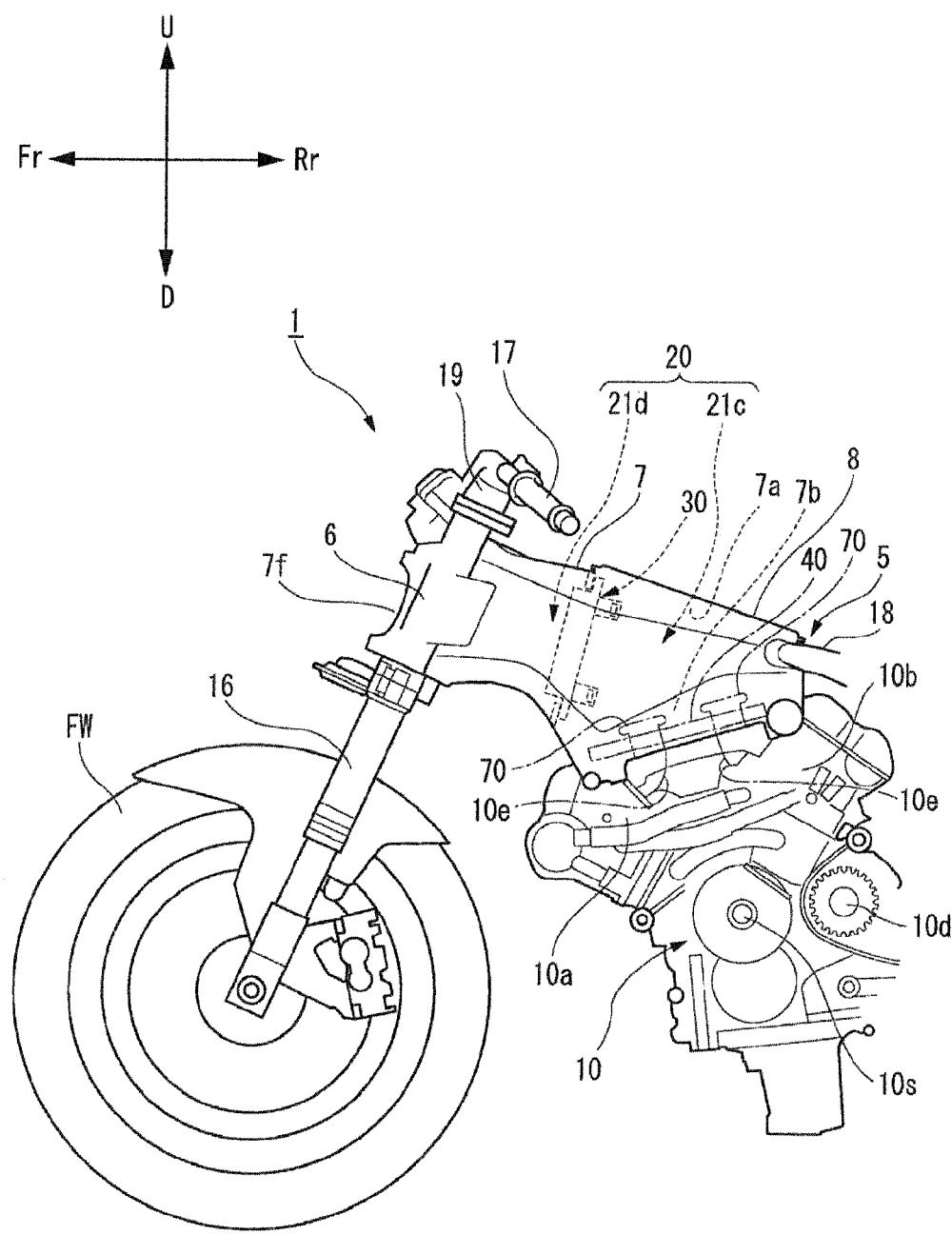
FIG. 1 is a partial left side elevational view of a saddle type vehicle which includes a lid member for an air cleaner according to the present invention.

In the following, a motorcycle which is a saddle type vehicle of an embodiment of the present invention is described with reference to FIGS. 1 to 10. It is to be noted that the drawings should be viewed in the direction of reference symbols, and in the following description, forward and rearward, leftward and rightward, and upward and downward directions are described so as to conform to directions as viewed from a rider. Further, in the drawings, the forward direction of the vehicle is denoted by Fr, the rearward direction by Rr, the leftward direction by L, the rightward direction by R, the upward direction by U, and the downward direction by D.

As depicted in FIG. 1, a vehicle body frame 5 which is a skeleton part of a motorcycle 1 is structured such that it has a main frame 7 which extends rearwardly of the vehicle from a head pipe 6 and is hollow in the inside thereof. Further, a seat (not depicted) for being seated by a rider is supported on a rear frame 18 which extends rearwardly from a rear portion of the main frame 7. A suspension steering mechanism for a front wheel FW includes a front fork 16 attached for steering movement to the head pipe 6, and a bar handle 17 attached to an upper end of a steering shaft 19 which extends through the head pipe 6 at an upper portion of the front fork 16. Further, an engine 10 for driving a rear wheel (not depicted) is held below the main frame 7.

The engine 10 is a V-type engine wherein, for example, a plurality of cylinder units 10a and 10b juxtaposed leftwardly and rightwardly and individually having two cylinders on each of the front and rear sides are disposed in a V-shape in the forward and rearward direction with reference to a crankshaft portion 10s.

Further, on the lower side of the rear frame 18, a rear wheel (not depicted) is supported on a swing arm (not depicted) supported for upward and downward rocking motion by a pivot on the rear end side of the engine. It is to be noted that, to the rear wheel, driving force is transmitted by a drive chain (not depicted) extending between a driving sprocket wheel 10d on the engine 10 side and a driven sprocket wheel (not depicted) on the rear wheel side.

Figure 2:
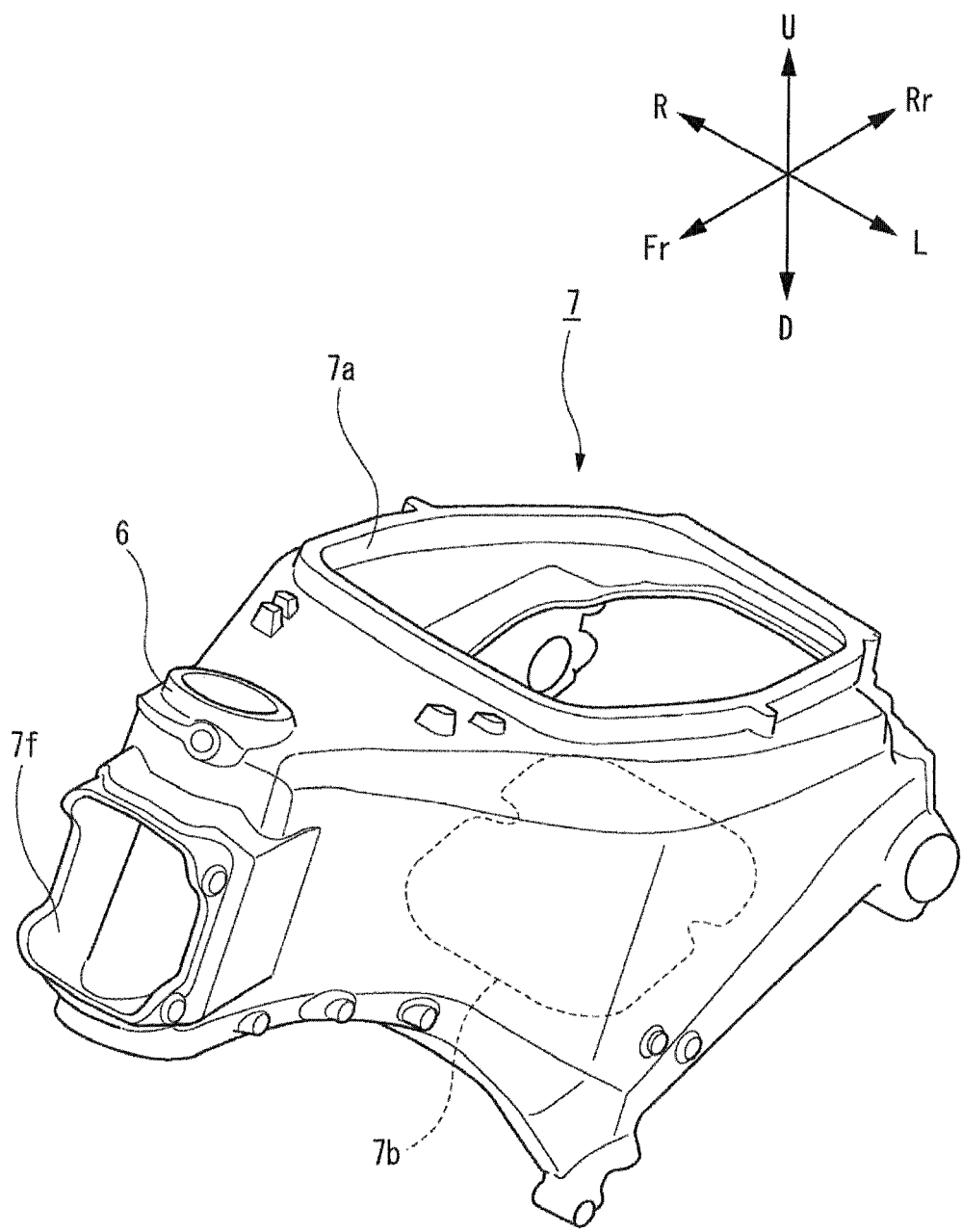
FIG. 2 is an exploded perspective view depicting a main frame which forms an air cleaner as viewed obliquely from a left upper point in the saddle type vehicle depicted in FIG. 1.
Figure 3:
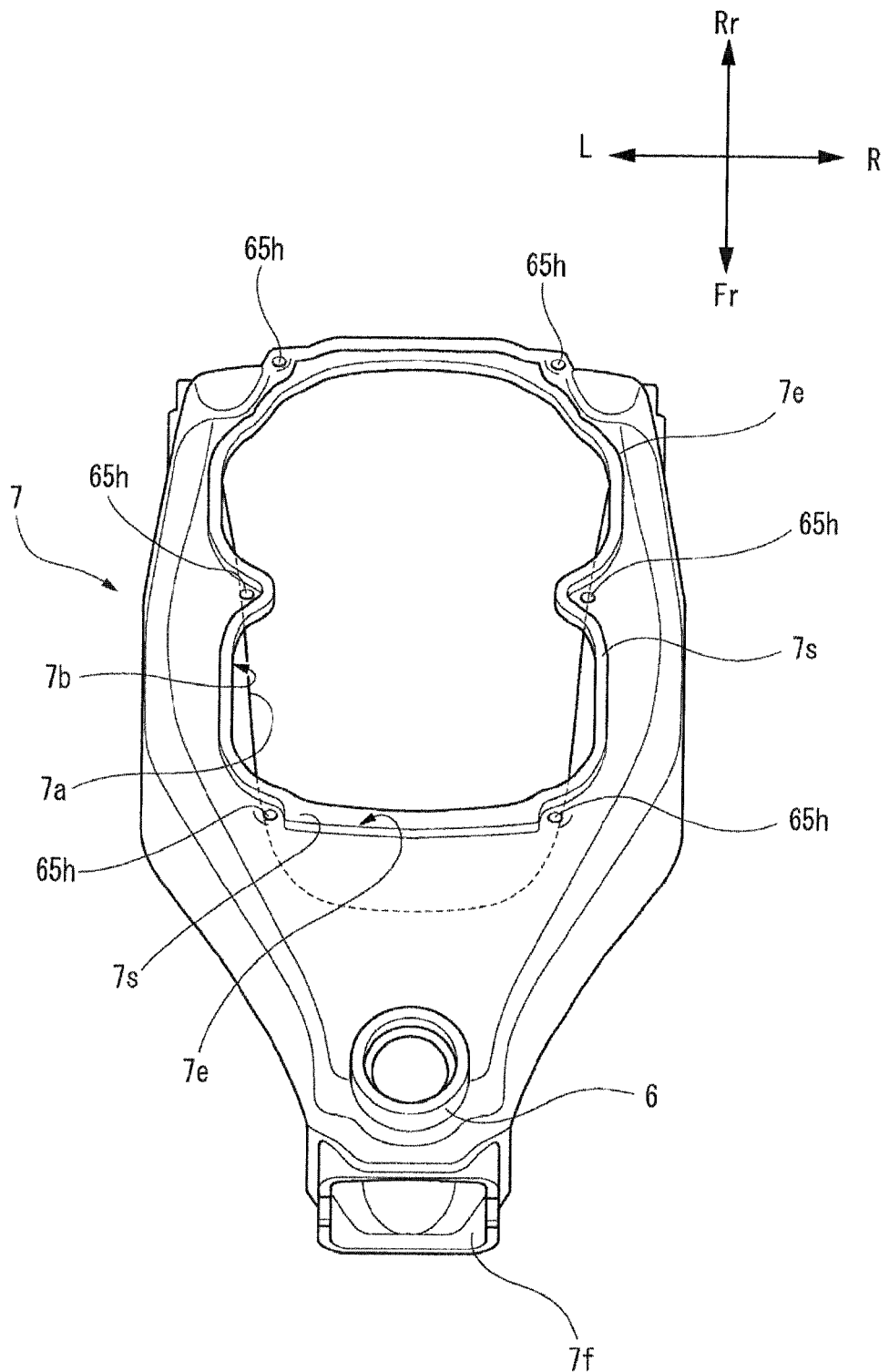
FIG. 3 is a perspective view depicting the main frame which forms the air cleaner as viewed from a lower front point in the saddle type vehicle depicted in FIG. 1.

As depicted in FIGS. 1, 2, and 3, the main frame 7 has a monocoque structure having a large internal space formed therein. At a front portion of the main frame 7, a front opening 7f for introducing air therethrough is formed, and at a lower portion of the main frame 7, a communicating opening 7b communicating with the engine 10 is formed. Further, at an upper portion of the main frame 7, an upper opening 7a is provided, which is closed by an upper lid member 8.

In this main frame 7, a filter element 30 is suitably attached. Accordingly, an air cleaner 20 is formed such that a front side of the filter element 30 is formed as a dirty side region 21d and a rear side of the filter element 30 is formed as a clean side region 21c. Here, the engine 10 and the clean side region 21c of the air cleaner 20 disposed below the main frame 7 have provided thereon a plurality of intake path members 70 (in the present embodiment, four (refer to FIG. 5)) which are held on a lid member 40 (refer to FIG. 4) hereinafter described which closes the communicating opening 7b. The intake path members 70 are connected to a throttle body 10e.

Figure 4:
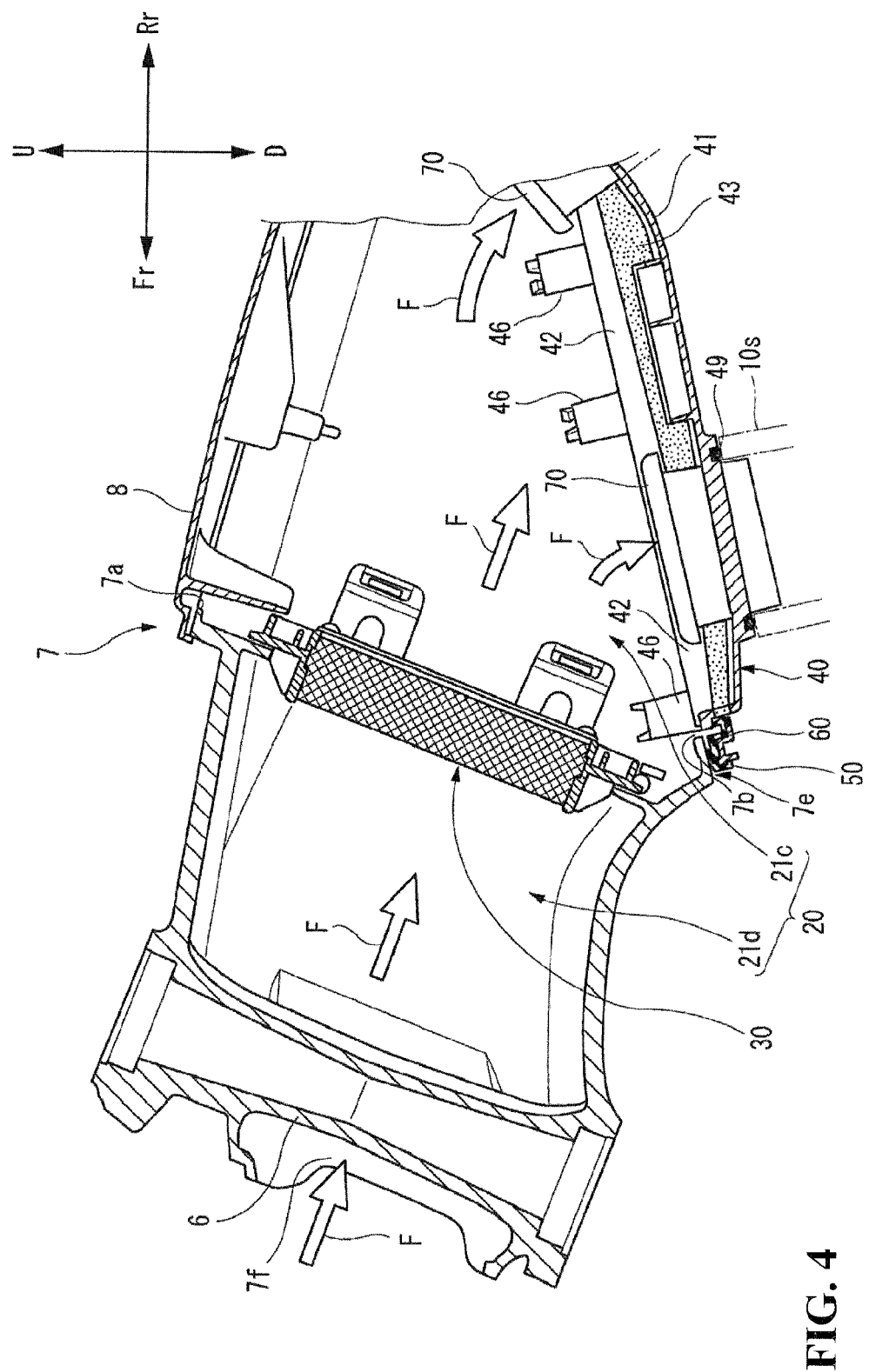
FIG. 4 is a partial schematic sectional view when the main frame which forms the air cleaner in the saddle type vehicle depicted in FIG. 1 is taken along a forward and rearward direction.

In the air cleaner 20 configured in this manner, as depicted in FIG. 4, an intake air flow F flows in from the front, enters the dirty side region 21d from the front opening 7f, passes through the filter element 30, enters the clean side region 21c, and then is supplied from the intake path members 70, which are open to the clean side region 21c, into the throttle body 10e.

The lid member 40 is structured in a shape corresponding to the shape of the communicating opening 7b depicted in FIG. 3 in such a manner so as to cover the communicating opening 7b and is shaped (refer to FIG. 5) such that a substantially central portion thereof is constricted a little.

This lid member 40 is structured such that it has a first plate member 41, a second plate member 42, and an elastic member 43. More particularly, the lid member 40 is structured in the following manner. The first plate member 41 has a plate-like shape and has four communicating holes 40h, into which the intake path members 70 to the engine 10 are to be inserted, provided thereon and is positioned between the engine 10 and the main frame 7. The second plate member 42 has a form of a frame and contacts with an outer periphery edge portion 7e of the communicating opening 7b in such a manner so as to surround an outer periphery of the first plate member 41. The elastic member 43 is disposed between the first plate member 41 and the second plate member 42.

Figure 5:
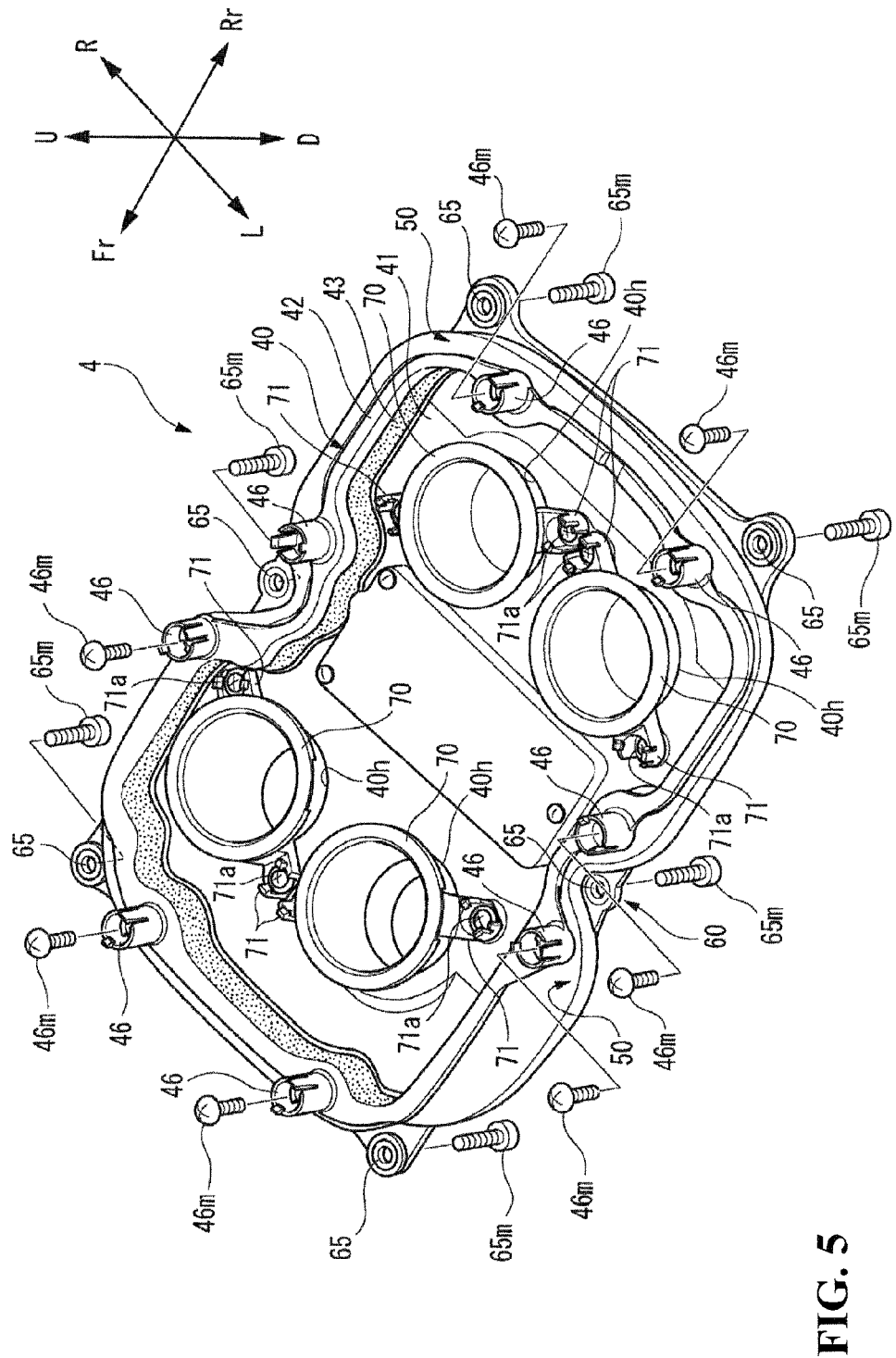
FIG. 5 is a perspective view of the lid member for the air cleaner according to the present invention as viewed from above.

Further, in FIG. 5, a state in which the intake path members 70 are fixed to the first plate member 41 by screw members 71a mounted on attaching portions 71 is illustrated. However, the mounting of the intake path members 70 may be carried out not before the lid member 40 is attached to the vehicle body, but after the lid member 40 is mounted on the vehicle body.

Further, between end faces of the first plate member 41 and the throttle body 10e, a seal member 49 such as, for example, an 0-snap ring and so forth (refer to FIG. 4) are provided at a position surrounding the periphery of each intake path member 70 to secure the airtightness.

Meanwhile, the second plate member 42 provided on the outermost periphery of the lid member 40 has eight substantially cylindrical screw receiving portions 46 provided in a projecting manner at predetermined distances and each having an opening (not depicted) for accepting a first fastening member 46m as depicted in FIG. 5.

Further, the elastic member 43 extends in the upward and downward direction along and connects an outer peripheral portion of the first plate member 41 and an inner peripheral portion of the second plate member 42 to each other. In particular, the elastic member 43 connects the first plate member 41 positioned on the lower side and the second plate member 42 positioned on the upper side to each other such that they are offset from each other in the upward and downward direction.

The first plate member 41 and the second plate member 42 are formed from a synthetic resin. Further, recess and projection joining faces 45a are formed at connection portions 45 between the elastic member 43 and the first plate member 41 and second plate member 42. The recess and projection joining faces 45a have an increased joining area together with a catching structure in the thicknesswise direction of the connection portions 45.

The elastic member 43 is formed from a rubber material which connects the first plate member 41 and the second plate member 42 to each other by baking. Accordingly, the first plate member 41, second plate member 42, and elastic member 43 are connected firmly to each other by the recess and projection joining faces 45a baked to each other.

Figure 7:
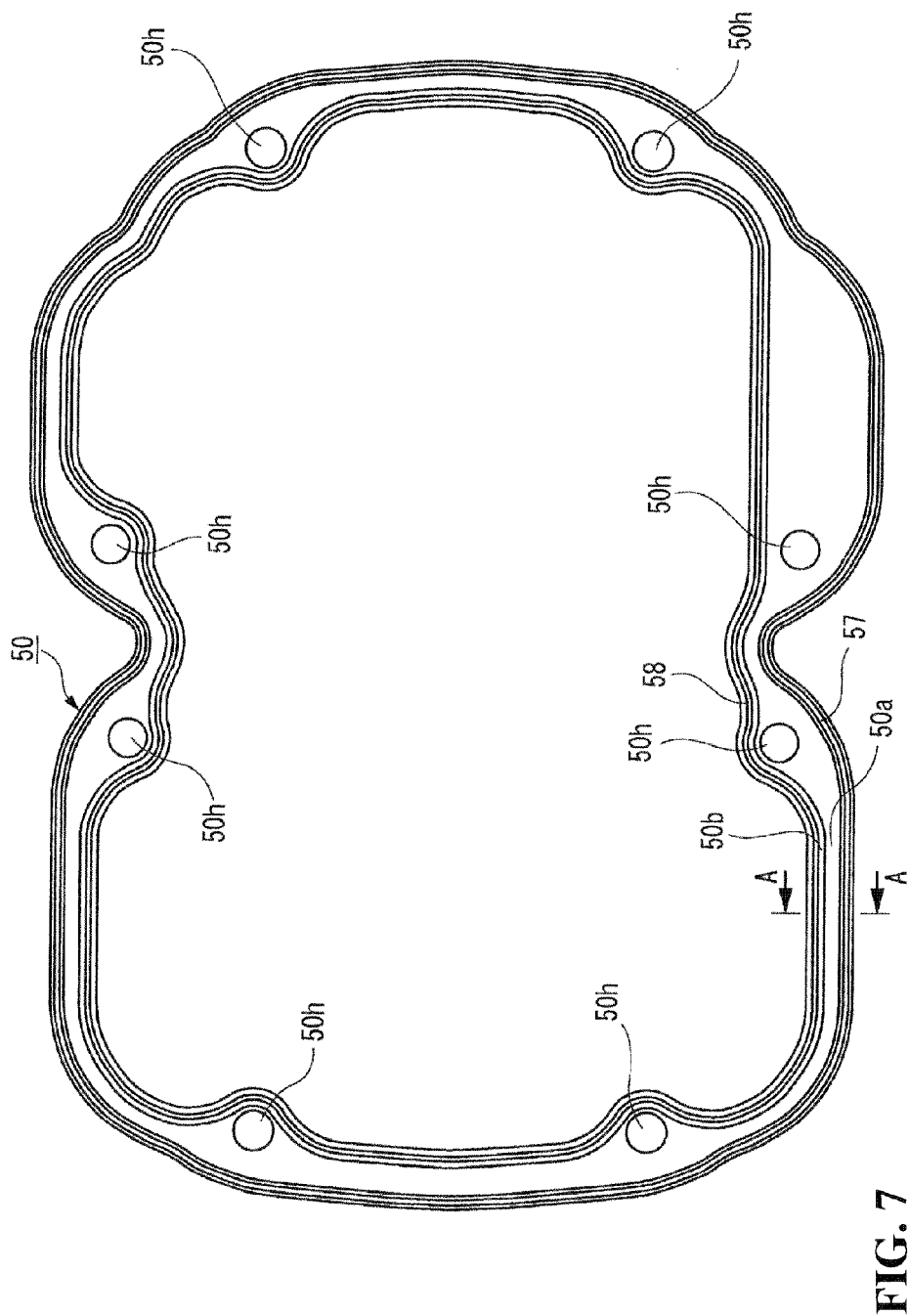
FIG. 7 is a plan view of a seal lip which is mounted on the lid member for the air cleaner according to the present invention.

Further, in the present embodiment, in order to seal the lid member 40 with respect to the main frame 7, a seal lip 50 (refer to FIG. 5) is provided such that it is formed in a substantially annular shape substantially corresponding to an outer peripheral edge of the lid member 40 as depicted in FIG. 7. Although this seal lip 50 is not particularly limited if it is made of a material which can secure the sealing property of the lid member 40, it can be formed from a rubber material or the like having suitable elasticity.

Figure 6:
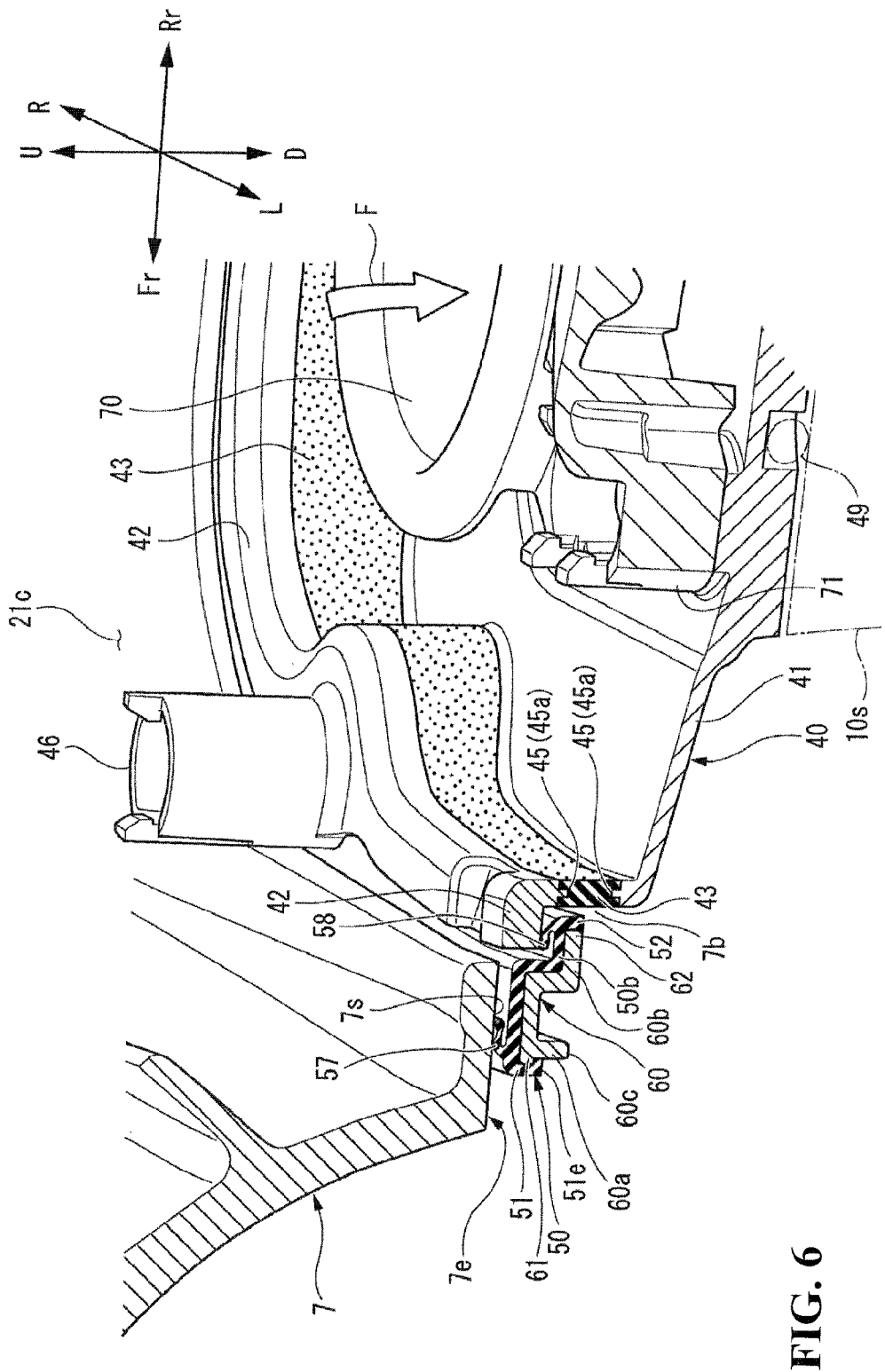
FIG. 6 is a partial sectional perspective view of the lid member of the air cleaner according to the present invention in a mounted state.
Figure 8:
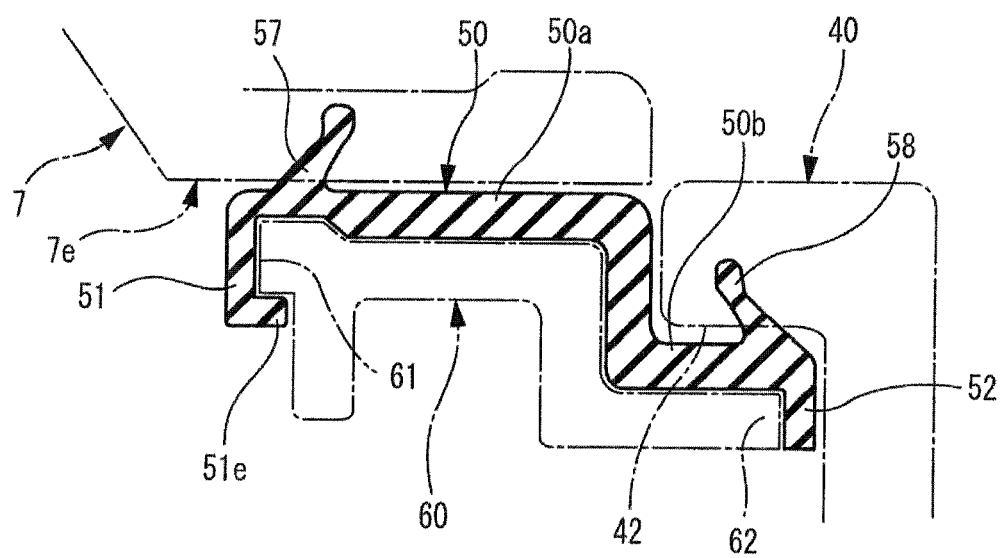
FIG. 8 is a sectional view of a portion of the seal lip depicted in FIG. 7 taken along a line A-A.

If a cross sectional shape of the seal lip 50 is observed, then a frame abutting portion 50a on the outer periphery side which abuts with the main frame 7 and a lid abutting portion 50b on the inner periphery side which abuts with the lid member 40 are formed in parallel to each other with a suitable offset provided therebetween, for example, as depicted in FIGS. 6 and 8. Further, in order to further raise the sealing property of the frame abutting portion 50a with the outer periphery edge portion 7e of the main frame 7, a frame lip 57 is provided in a projecting manner on the frame abutting portion 50a such that it is inclined suitably to the outer periphery edge portion 7e side. Further, in order to further raise the sealing property of the lid abutting portion 50b with the second plate member 42 of the lid member 40, a lid lip 58 is provided in a projecting manner on the lid abutting portion 50b such that it is inclined suitably toward the upper side. Further, an inner periphery end portion 52 of the seal lip 50 is extended to the lower side such that it covers an inner periphery end 62 of a fixing member 60. Further, an outer periphery end portion 51 of the seal lip 50 includes such a hooked end portion 51e as may be caught by an outer periphery end 61 of the fixing member 60. Further, eight screw openings 50h are formed on the seal lip 50 along a circumferential direction. The screw openings 50h are formed at positions corresponding to the screw receiving portions 46 of the lid member 40.

Figure 9:
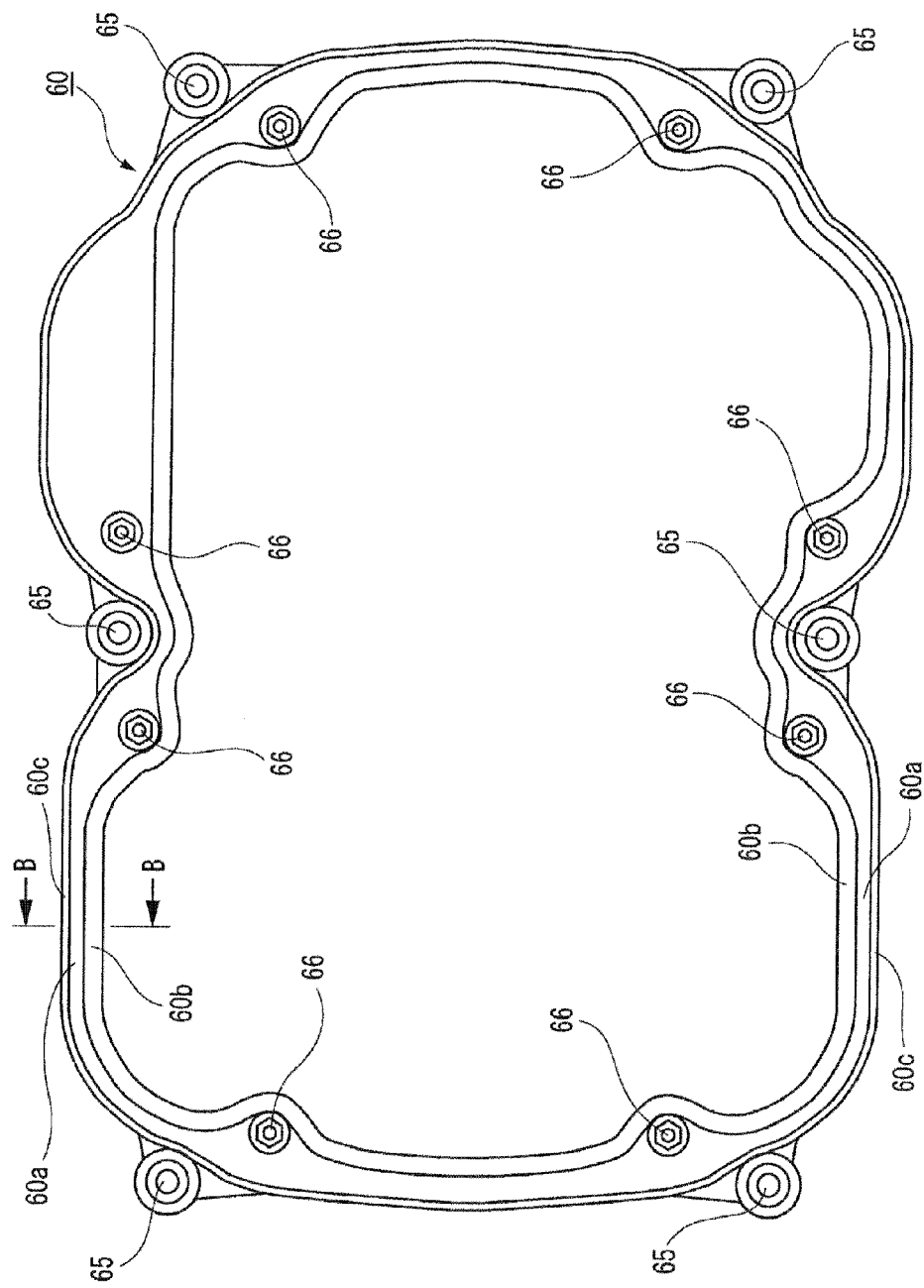
FIG. 9 is a plan view of a fixing member for mounting the lid member for the air cleaner according to the present invention to the main frame.

In the present embodiment, the fixing member 60 is provided in order to attach the lid member 40 to the main frame 7. This fixing member 60 is a member formed in a substantially annular shape so as to surround the lid member 40 (refer to FIG. 5) as depicted in FIG. 9. Further, the fixing member 60 suitably has rigidity because a function for pressing the lid member 40 against the main frame 7 side is required. The fixing member 60 can be formed, for example, from a metal. Further, the fixing member 60 has, at each corner portion (four corners) and on the left and right of a medium stage portion in the forward and rearward direction (longitudinal direction), an attaching hole 65 formed thereon such that a second fastening member 65m (refer to FIG. 5) extends through the attaching hole 65. Further, on an inner periphery side of the attaching hole 65, eight female threaded portions 66 corresponding to the screw receiving portions 46 of the lid member 40 are formed.

Figure 10:
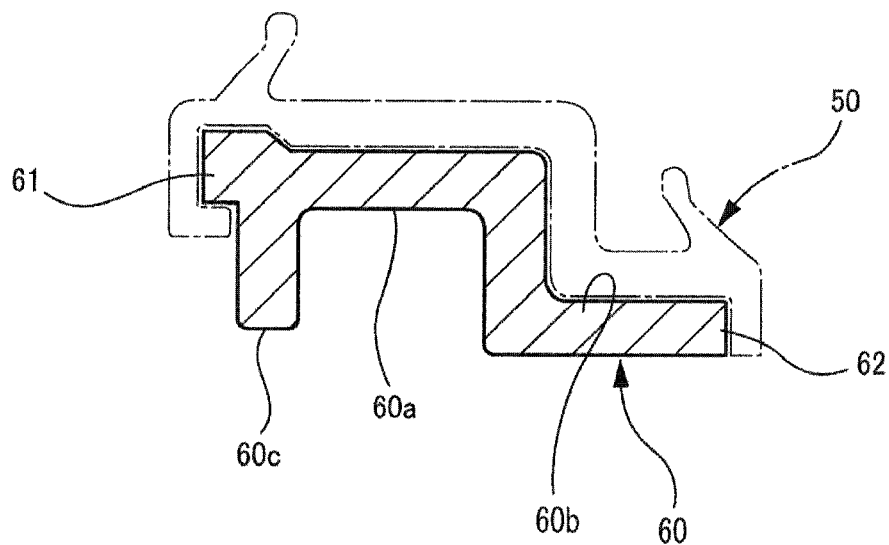
FIG. 10 is a sectional view of a portion of the fixing member depicted in FIG. 7 taken along a line B-B.

If a cross sectional shape of the fixing member 60 is viewed, then a frame facing portion 60a on the outer periphery side which faces the outer periphery edge portion 7e of the main frame 7 and a lid facing portion 60b on the inner periphery side which faces the second plate member 42 of the lid member 40 are formed on the fixing member 60 such that they have an offset in the upward and downward direction as depicted in FIGS. 6 and 10. Further, an outer peripheral wall portion 60c extending downwardly is provided on the outer periphery side of the fixing member 60 to raise the rigidity of the fixing member 60. Further, the outer periphery end 61 of the fixing member 60 projects to the outer side farther than the outer peripheral wall portion 60c and can be caught by the outer periphery end portion 51 of the seal lip 50 as described hereinabove. The inner periphery end 62 is structured such that it corresponds to the inner periphery end portion 52 of the seal lip 50.

As illustrated in FIG. 5, in the present embodiment, the lid member 40, fixing member 60, and seal lip 50 are fastened together by the eight first fastening members 46m inserted in the female threaded portions 66 through the screw openings 50h (refer to FIG. 7) from the screw receiving portions 46. More particularly, the lid member 40 is formed as a lid member unit 4 integrated in a state wherein the lid member 40 cooperates with the fixing member 60 with the seal lip 50 sandwiched therebetween. In this manner, in the state in which the lid member 40, fixing member 60, and seal lip 50 are fastened together by the first fastening members 46m in this manner, the second plate member 42 and the fixing member 60 crush a peripheral portion of the seal lip 50 around the lid lip 58 from the upward and downward directions (refer to FIG. 6). Therefore, the sealing property between the lid member 40 and the fixing member 60 is maintained favorably.

Further, when the lid member unit 4 is to be attached, the second fastening members 65m extending through the attaching holes 65 of the fixing member 60 are screwed into six attaching threaded portions 65h provided around the communicating opening 7b of the main frame 7 to attach the lid member unit 4. By the attachment of the fixing member 60, a peripheral portion of the seal lip 50 around the frame lip 57 is crushed from the upward and downward directions between the fixing member 60 and the outer periphery edge portion 7e of the communicating opening 7b. See, FIG. 6. Consequently, the sealing between the fixing member 60 and the main frame 7 is maintained favorably.

Further, the main frame 7 in the present embodiment is formed by casting. Further, the outer periphery edge portion 7e of the communicating opening 7b is subject to polishing processing at an outer side wall face 7s thereof. In particular, the outer side wall face 7s of the outer periphery edge portion 7e with which the seal lip 50 of the lid member unit 4 contacts has a good surface nature and contributes to the sealing property.

Further, in the present embodiment, as depicted in FIG. 1, the engine 10 is a V-type engine wherein a plurality of cylinder units 10a and 10b are disposed in a V-shape in the forward and rearward direction as described hereinabove. However, the lid member 40 which holds the four intake path members 70 communicating with the cylinder units 10a and 10b is disposed so as to be sandwiched between the cylinder units 10a and 10b.

In this manner, in the present embodiment, the lid member 40 which closes the communicating opening 7b on the lower face of the clean side region 21c which is a connecting portion between the engine 10 structured such that the air cleaner 20 is provided in the internal space of the main frame 7 and the main frame 7 is configured such that the elastic member 43 is provided between the first plate member 41 in which the communicating holes 40h into which the intake path member 70 to the engine 10 are inserted and the second plate member 42 which surrounds the outer periphery of the first plate member 41. Therefore, upon assembly of the lid member 40, even if a tolerance appears between the arrangement of the intake path member 70 and the arrangement of the communicating opening 7b of the air cleaner 20, the tolerance can be permitted by the elasticity of the elastic member 43 thereby to enhance the assembling property. Further, the sealing property between the clean side region 21c and the engine side can be secured.

Further, the lid member 40 can effectively absorb also vibration differences between the engine 10 and the main frame 7 by the elasticity of the elastic member 43, and also the durability can be improved while the sealing property is secured.

Further, in the present embodiment, since the elastic member 43 connects the first plate member 41 and the second plate member 42 to each other such that they are displaced from each other in the upward and downward direction, the elastic member 43 can be expanded and contracted in the heightwise direction and can be deflected also in a transverse direction. Therefore, a three-dimensional movement (upward or downward, leftward or rightward, and forward or rearward movements) by vibrations and so forth of the engine 10 can be absorbed effectively. Further, the lid member 40 can maintain the contact property of the connecting portion favorably, and the sealing property of the clean side region 21c can be secured.

Further, in the present embodiment, the fixing member 60 and the seal lip 50 which are formed as separate members from each other are used for fixation of the lid member 40.

Therefore, the sealing property between the lid member 40 and the clean side region 21c is secured. Further, suppression of transmission of vibrations between the main frame 7 and the lid member 40 and absorption of the vibrations can be carried out by the seal lip 50.

Further, in the present embodiment, since the lid member 40, fixing member 60, and seal lip 50 are configured as the commonly fastened lid member unit 4, when the lid member 40 is assembled or disassembled, the three members can be treated as one member of the lid member unit 4. Thus, the workability is good. Further, since the lid member 40 can be fixed with certainty only by fixedly fastening the fixing member 60 to the main frame 7 by the second fastening member 65m, the fastening which secures the sealing property of the clean side region 21c can be achieved easily.

Further, in the present embodiment, the elastic member 43 is formed from a rubber material to which the first plate member 41 and the second plate member 42 are baked. Consequently, the lid member 40 can be treated as an integral part including the elastic member 43, and therefore, securing of the sealing property is easy together with enhancement of the handling properties.

Further, in the present embodiment, the first plate member 41 and the second plate member 42 are formed from a synthetic resin, and the recess and projection joining faces 45a are formed on the connection portions 45 between the elastic member 43 and the first plate member 41 and second plate member 42. Therefore, the joining area between the elastic member 43 and the first plate member 41 and second plate member 42 can be made great. Consequently, the connection portions 45 can achieve firm joining. Accordingly, the durability of the lid member 40 is secured, and also the sealing property of the clean side region 21c is maintained for a long period of time.

Further, in the present embodiment, the main frame 7 is formed by casting, and the outer side wall face 7s of the outer periphery edge portion 7e of the communicating opening 7b with which the lid member 40 contacts is subject to polishing processing and the outer side wall face 7s is formed not on an inner side wall face but on an outer face of the main frame 7. Therefore, the polishing processing performance is good, and the contact property of the outer side wall face 7s with the lid member 40 can be improved and the sealing property can be secured more readily.

Further, in the present embodiment, in the V-type engine having a plurality of cylinder units 10a and 10b, the lid member 40 having the elastic member 43 which can absorb the tolerance between the cylinder units 10a and 10b is provided. Therefore, even where the tolerance between the cylinder units 10a and 10b is accumulated, the tolerance can be absorbed by expansion or contraction of the lid member 40, and the lid member 40 can secure the sealing property of the clean side region 21c.

While an embodiment of the present invention has been described, the present invention is not limited to this and the embodiment can be altered suitably. For example, in the embodiment described above, the elastic member 43 of the lid member 40 is structured such that it connects the first and second plate members 41 and 42 substantially vertically in the upward and downward direction. However, the elastic member 43 may be structured otherwise such that it connects the first and second plate members 41 and 42 to each other in a juxtaposed state in a substantially horizontal direction or such that it connects the first and second plate members 41 and 42 to each other obliquely. Further, as regards the sectional shape of the elastic member 43, in the embodiment described above, it merely is a substantially rectangular shape. However, the sectional shape can be changed suitably, for example, to a bent shape or a curved shape or else to a combination shape of them. Further, also with regard to the shape of the first and second plate members 41 and 42 of the elastic member 43 and the recess and projection joining faces 45a of the connection portions 45, it is not limited to that in the embodiment described above, but can be changed suitably also in regard to the recess and projection relationship, the number of recesses and projections, and the shape.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle, comprising:
   a main frame extending rearwardly of the vehicle from a head pipe, said main frame including a hollow inside portion;
   an air cleaner including a filter element disposed in the main frame to partition the main frame into a dirty side region and a clean side region;
   an engine disposed below the main frame; and
   an intake path member configured to connect the engine and the clean side region to each other;
   the main frame having a front opening formed at a front portion thereof for introducing air therethrough;
   wherein a communicating opening for communicating with the engine is formed on a lower face side of the clean side region;
   the communicating opening is covered with a lid member; and
   the lid member includes a first plate member having a communicating hole in which the intake path member to the engine is inserted, a second plate member for surrounding an outer periphery of the first plate member, and an elastic member provided between the first plate member and the second plate member.

2. The saddle vehicle according to claim 1, wherein the first plate member and the second plate member have connection portions opposing to each other and the connection portions are offset from each other in a heightwise direction, and the elastic member is provided between the connection portions.

3. The saddle vehicle according to claim 1, further comprising:
   a seal lip formed in a substantially annular shape so as to surround an edge portion of a periphery of the lid member in order to seal the lid member with respect to the main frame; and
   a fixing member formed in a substantially annular shape so as to surround the lid member in order to attach the lid member to the main frame;
   wherein the seal lip is interposed between the main frame and the fixing member and interposed also between the lid member and the fixing member.

4. The saddle vehicle according to claim 2, further comprising:
   a seal lip formed in a substantially annular shape so as to surround an edge portion of a periphery of the lid member in order to seal the lid member with respect to the main frame; and
   a fixing member formed in a substantially annular shape so as to surround the lid member in order to attach the lid member to the main frame;

wherein the seal lip is interposed between the main frame and the fixing member and interposed also between the lid member and the fixing member.

5. The saddle vehicle according to claim 3, wherein the lid member, fixing member, and seal lip are fastened together by a first fastening member to configure a lid member unit, and the fixing member is fastened and fixed to the main frame by a second fastening member.

6. The saddle vehicle according to claim 1, wherein the elastic member is formed from a rubber material for connecting the first plate member and the second plate member to each other by baking.

7. The saddle vehicle according to claim 2, wherein the elastic member is formed from a rubber material for connecting the first plate member and the second plate member to each other by baking.

8. The saddle vehicle according to claim 3, wherein the elastic member is formed from a rubber material for connecting the first plate member and the second plate member to each other by baking.

9. The saddle vehicle according to claim 1, wherein the first plate member and the second plate member are formed from a synthetic resin; and
recess and projection joining faces are formed at connection portions between the elastic member and the first plate member and second plate member.

10. The saddle vehicle according to claim 2, wherein the first plate member and the second plate member are formed from a synthetic resin; and
recess and projection joining faces are formed at connection portions between the elastic member and the first plate member and second plate member.

11. The saddle vehicle according to claim 3, wherein the first plate member and the second plate member are formed from a synthetic resin; and
recess and projection joining faces are formed at connection portions between the elastic member and the first plate member and second plate member.

12. The saddle vehicle according to claim 1, wherein the lid member covers the communicating opening from below and the main frame is formed by casting, and an outer side wall face of an outer periphery edge portion of the communicating opening with which the lid member contacts is subject to a polishing processing.

13. The saddle vehicle according to claim 2, wherein the lid member covers the communicating opening from below and the main frame is formed by casting, and an outer side wall face of an outer periphery edge portion of the communicating opening with which the lid member contacts is subject to a polishing processing.

14. The saddle vehicle according to claim 1, wherein the engine is a V-type engine wherein a plurality of cylinder units are disposed in the V-shape in a forward and rearward direction; and
the lid member which holds the intake path member communicating with the cylinder units is disposed so as to be sandwiched between the cylinder units.

15. The saddle vehicle according to claim 2, wherein the engine is a V-type engine wherein a plurality of cylinder units are disposed in the V-shape in a forward and rearward direction; and
the lid member which holds the intake path member communicating with the cylinder units is disposed so as to be sandwiched between the cylinder units.

16. A saddle vehicle, comprising:
a hollow main frame;
an air cleaner including a filter element disposed in the main frame to partition the main frame into a dirty side region and a clean side region;
an intake path member configured to connect an engine and the clean side region to each other;
the main frame having a front opening formed at a front portion thereof for introducing air therethrough;
wherein a communicating opening for communicating with the engine is formed on a lower face side of the clean side region;
the lid member for covering the communicating opening, said lid member includes a first plate member having a communicating hole in which the intake path member to the engine is inserted, a second plate member for surrounding an outer periphery of the first plate member, and an elastic member provided between the first plate member and the second plate member.

17. The saddle vehicle according to claim 16, wherein the first plate member and the second plate member have connection portions opposing to each other and the connection portions are offset from each other in a heightwise direction, and the elastic member is provided between the connection portions.

18. The saddle vehicle according to claim 16, further comprising:
a seal lip formed in a substantially annular shape so as to surround an edge portion of a periphery of the lid member in order to seal the lid member with respect to the main frame; and
a fixing member formed in a substantially annular shape so as to surround the lid member in order to attach the lid member to the main frame;
wherein the seal lip is interposed between the main frame and the fixing member and interposed also between the lid member and the fixing member.

19. The saddle vehicle according to claim 18, wherein the lid member, fixing member, and seal lip are fastened together by a first fastening member to configure a lid member unit, and the fixing member is fastened and fixed to the main frame by a second fastening member.

20. The saddle vehicle according to claim 16, wherein the elastic member is formed from a rubber material for connecting the first plate member and the second plate member to each other by baking.

* * * * *